No. 607,768. Patented July 19, 1898.
J. A. RUDE.
TRAP.
(Application filed June 30, 1897.)
(No Model.)
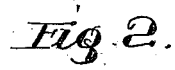
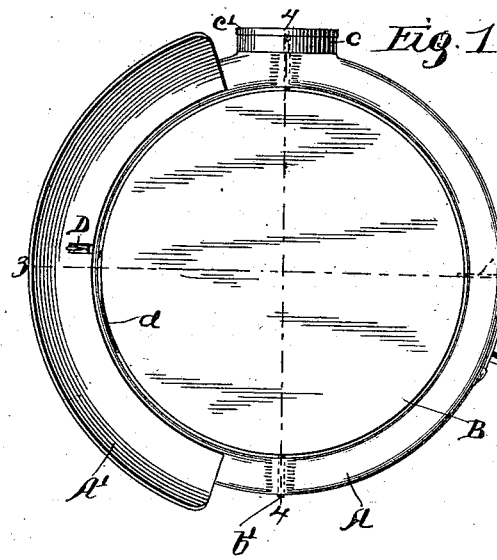
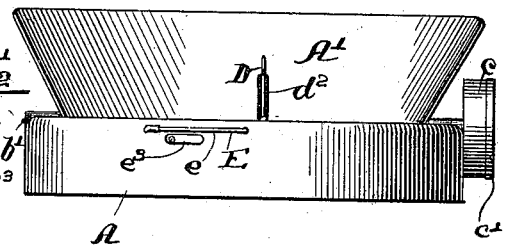
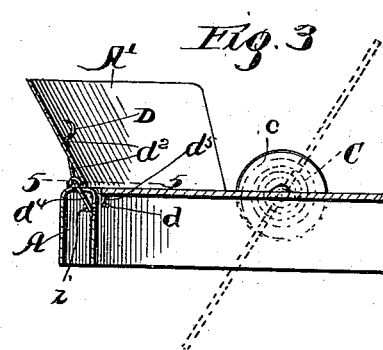
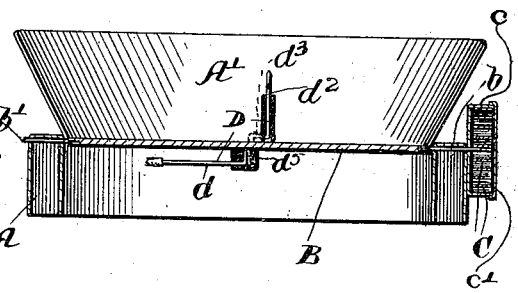
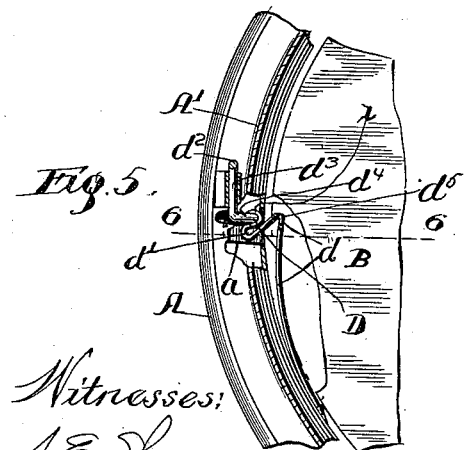
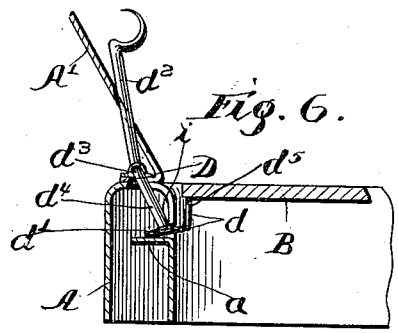
Witnesses:
A. E. Shervey
A. H. Nelson
Inventor:
John A. Rude
by Chas. O. Shervey
Attorney.
THE NORRIS PETERS CO., PHOTO-LITHO., WASHINGTON, D. C.

UNITED STATES PATENT OFFICE.

JOHN A. RUDE, OF CHICAGO, ILLINOIS.

TRAP.

SPECIFICATION forming part of Letters Patent No. 607,768, dated July 19, 1898.

Application filed June 30, 1897. Serial No. 642,957. (No model.)

*To all whom it may concern:*

Be it known that I, JOHN A. RUDE, a citizen of the United States of America, residing at Chicago, in the county of Cook and State of Illinois, have invented certain new and useful Improvements in Traps, of which the following is a specification.

My invention relates to certain new and useful improvements in traps, the object being to provide a trap which shall be comparatively automatic—that is to say, that may be sprung several times after it has been wound up without any attendance, it being arranged to set itself each time after being sprung. It is especially designed with a view to catching small animals—such as rats, mice, &c.—but may, however, be constructed in various sizes, and thereby adapted to catch larger animals.

To such end it consists in certain novel features of construction, a description of which will be found in the following specification and the essential features more definitely pointed out in the appended claims.

The invention is clearly illustrated in the accompanying drawings, in which—

Figure 1 is a plan view of the trap in its simplest form. Fig. 2 is a front elevation, the view being in the direction of the arrow 2 in Fig. 1. Fig. 3 is a section in line 3 3 of Fig. 1. Fig. 4 is a cross-section in line 4 4 of Fig. 1. Fig. 5 is a horizontal section in line 5 5 of Fig. 3, upon an enlarged scale. Fig. 6 is an enlarged vertical section in line 6 6 of Fig. 5.

In the drawings, A is an annular channel-shaped frame having in cross-section the form of an inverted U, the purpose of which is to adapt the same to be placed upon a pail, barrel, &c., the sides of the same being adapted to embrace the sides of the latter and be securely supported thereon. A guard A' is secured to the frame for the purpose of preventing the animals from entering the trap on this side. Within this ring and preferably flush with the top thereof is pivoted a rotatable door B, which is provided with two diametrically-opposite pins $b$ $b'$, journaled in the frame A in any suitable manner. The pin $b$ extends beyond the face of the frame A and is secured to one end of a helical spring C, the other end of which is secured to a casing $c$, secured to the frame A, a cover $c'$ being secured to the casing to inclose the spring. By revolving the door B in the direction of the arrow $x$ in Fig. 3 the spring may be wound up in order to put the trap into working order.

To set the trap and hold the door against the action of the spring, I have provided a tripping device D, consisting of a spring-catch $d$, secured to the frame in any suitable manner and normally engaging the under side of the door, as seen at $d^5$ in Fig. 6. A projecting portion $d'$ extends from the main portion of the catch and rests upon a ledge or shoulder $a$, formed upon the frame, so that the pressure of the door upon the catch is taken up by the shoulder $a$. The trigger proper consists of a shank $d^2$, preferably hooked upon one end to receive the bait and formed with a pivot $d^3$, journaled upon the frame A, and a downwardly-extending foot $d^4$, passing through an eye $i$ in the catch $d$. The foot inclines forward from the pivot at a slight angle, so that as the door is rotated in winding up the spring it will force the spring-catch $d$ up the inclined foot until the door passes the same. To prevent the opposite side of the door from swinging down when any weight is thereon, I have provided a second catch E, preferably made from a piece of wire and bent to form the spring portion $e$, secured to the frame A, a portion $e'$ passing through the frame and engaging the under side of the door, and a downwardly and outwardly inclined portion $e^2$, against which the door strikes when the trap has been sprung, thereby crowding the catch back until the door passes by, when the catch springs back and engages the under side of the door.

I have provided a button $e^3$, pivotally secured to the frame and adapted to be swung between the portion $e$ and frame to keep the projecting portion $e'$ from being struck by the door when being wound up.

In operation the trap is sprung by disturbing the trigger, which when pulled draws the catch away from the door, which is instantly revolved, the animal being precipitated into the pail. The instant the trigger is released the catch springs back into place and stops the door, and the trap is set and ready to be sprung again.

From the above it will be seen that this trap is adapted to be sprung several times after it has been wound up without the need of its being set by any one.

I claim as new and desire to secure by Letters Patent—

1. In a trap, a frame, a rotatable door pivoted upon the frame, a spring adapted to rotate the door in one direction, a spring-catch engaging the door, a trigger pivoted upon the frame, and formed with a downwardly and forwardly inclined foot, said spring-catch being formed with an eye engaging the foot, and with an extension, $d'$, adapted to rest upon a shoulder in the frame when the door is in a locked position, the rotation of the door in one direction being resisted by the spring-catch, except when drawn out of engagement with the door, and the rotation of the door in the opposite direction forcing the catch up the inclined foot and out of the way of the door.

2. In a trap, a rotatable door, a spring for intermittently rotating the door in one direction, a trigger for resisting such rotation, except when agitated to release the same, a spring-catch, E, adapted to prevent rotation of the door in the opposite direction, and a button $e^3$, adapted to be swung behind said catch when the latter is drawn out of engagement with the door, whereby the door may be rotated in a direction opposite to that given it by the spring without striking said catch in winding up the spring.

3. In a trap, the combination with the trough-shaped frame, A, of the rotatable door, B, pivoted upon the frame, a spring, C, adapted to rotate the door in one direction, a spring-catch, $d$, lying in a plane approximately with that of the door when in a locked position, and engaging the door, a trigger pivoted upon the frame and formed with a downwardly and forwardly inclined foot, the spring-catch, being formed with an eye engaging the foot and with an extension, $d'$, adapted to rest upon a suitable part of the frame, the rotation of the door in one direction being resisted by the spring-catch, except when drawn out of engagement with the door, and the rotation of the door in the opposite direction forcing the catch up the inclined foot and out of the way of the door.

In witness whereof I have hereunto set my hand, at Chicago, in the county of Cook and State of Illinois, this 26th day of June, A. D. 1897.

JOHN A. RUDE.

Witnesses:
CHAS. O. SHERVEY,
A. E. SHERVEY.